United States Patent
Naito et al.

(10) Patent No.: US 11,705,593 B2
(45) Date of Patent: Jul. 18, 2023

(54) RACK TYPE POWER SOURCE DEVICE

(71) Applicant: Panasonic Intellectual Property Management Co., Ltd., Osaka (JP)

(72) Inventors: Keisuke Naito, Osaka (JP); Takashi Hasegawa, Osaka (JP)

(73) Assignee: PANASONIC INTELLECTUAL PROPERTY MANAGEMENT CO., LTD., Osaka (JP)

( * ) Notice: Subject to any disclaimer, the term of this patent is extended or adjusted under 35 U.S.C. 154(b) by 894 days.

(21) Appl. No.: 16/468,776

(22) PCT Filed: Dec. 13, 2017

(86) PCT No.: PCT/JP2017/044641
§ 371 (c)(1),
(2) Date: Jun. 12, 2019

(87) PCT Pub. No.: WO2018/123577
PCT Pub. Date: Jul. 5, 2018

(65) Prior Publication Data
US 2019/0372068 A1 Dec. 5, 2019

(30) Foreign Application Priority Data
Dec. 26, 2016 (JP) ................. 2016-250657

(51) Int. Cl.
*H01M 10/613* (2014.01)
*H01M 10/627* (2014.01)
(Continued)

(52) U.S. Cl.
CPC ....... *H01M 10/613* (2015.04); *H01M 10/425* (2013.01); *H01M 10/627* (2015.04);
(Continued)

(58) Field of Classification Search
CPC ............. H01M 50/209; H01M 50/211; H01M 50/213; H01M 50/216; H01M 50/218;
(Continued)

(56) References Cited

U.S. PATENT DOCUMENTS

2012/0263989 A1* 10/2012 Byun .................. H05K 7/1492
361/752
2014/0017528 A1 1/2014 Uehara et al.

FOREIGN PATENT DOCUMENTS

| CN | 104134762 A | 11/2014 |
| EP | 2634835 A1 | 9/2013 |
| WO | 2012/132134 | 10/2012 |

OTHER PUBLICATIONS

English Translation of Chinese Office Action dated Aug. 25, 2021 for the related Chinese Patent Application No. 201780078301.8.
(Continued)

*Primary Examiner* — Nathanael T Zemui
(74) *Attorney, Agent, or Firm* — McDermott Will & Emery LLP

(57) ABSTRACT

A rack type power source device includes a plurality of battery packs, a rack to house the plurality of battery packs being arranged, and a connector plate fixed to the rack at a far side in a direction in which the battery packs are inserted into the rack. The connector plate is provided with a plurality of connectors designed to be electrically connected to terminals of the plurality of battery packs. The connector plate includes a side wall that constitutes a part of a first-side wall of the rack, and a connector mount wall disposed at an inner position in the rack so as to form a depth difference from the side wall. The connector mount wall is provided with the plurality of connectors arranged corresponding to the battery packs housed in the rack.

7 Claims, 8 Drawing Sheets

(51) Int. Cl.
*H01M 10/6556* (2014.01)
*H01M 10/6563* (2014.01)
*H01M 10/42* (2006.01)
*H01M 50/209* (2021.01)
*H01M 50/503* (2021.01)
H01M 10/647 (2014.01)
H01M 10/48 (2006.01)
H01M 50/224 (2021.01)
H01M 50/227 (2021.01)
H01M 50/517 (2021.01)

(52) U.S. Cl.
CPC ... *H01M 10/6556* (2015.04); *H01M 10/6563* (2015.04); *H01M 50/209* (2021.01); *H01M 50/503* (2021.01); H01M 10/48 (2013.01); H01M 10/647 (2015.04); H01M 50/224 (2021.01); H01M 50/227 (2021.01); H01M 50/517 (2021.01)

(58) Field of Classification Search
CPC .. H01M 50/22; H01M 50/222; H01M 50/224; H01M 50/227; H01M 50/229; H01M 50/231; H01M 50/233; H01M 50/236; H01M 50/238; H01M 50/24; H01M 50/242; H01M 50/244; H01M 50/247; H01M 50/249; H01M 50/251; H01M 50/253; H01M 50/262; H01M 50/264; H01M 50/267; H01M 50/269; H01M 50/271; H01M 50/273; H01M 50/276; H01M 50/278; H01M 50/28; H01M 50/282; H01M 50/284; H01M 50/287; H01M 50/289; H01M 50/291; H01M 50/293; H01M 50/296; H01M 50/298; H01M 10/613; H01M 10/6556; H01M 10/6563; B60L 50/64
See application file for complete search history.

(56) References Cited

OTHER PUBLICATIONS

International Search Report of PCT application No. PCT/JP2017/044641 dated Jan. 30, 2018.

* cited by examiner

RACK TYPE POWER SOURCE DEVICE

This application is a U.S. national stage application of the PCT International Application No. PCT/JP2017/044641 filed on Dec. 13, 2017, which claims the benefit of foreign priority of Japanese patent application No. 2016-250657 filed on Dec. 26, 2016, the contents all of which are incorporated herein by reference.

TECHNICAL FIELD

The present invention relates to a rack type power source device that includes a rack to house a plurality of battery packs.

BACKGROUND ART

PTL 1 described below discloses a conventional power source device including a rack divided into compartments and a plurality of battery packs housed in the respective compartments. The battery packs are each made up of a combination of a plurality of single batteries. In the power source device, when the battery packs are inserted and housed in the compartments, output terminals disposed on rear surfaces of the battery packs are inserted into input terminals disposed in inner recesses of the compartments. In this state, the plurality of battery packs housed in the rack is connected in series or parallel to one another by leads that are each connected between the input terminals at a rear of the rack.

CITATION LIST

Patent Literature

PTL 1: WO 2012/132134 A

SUMMARY OF THE INVENTION

It is conceivable that a rack type power source device including a plurality of battery packs housed in a rack has a backboard in the rack, and the backboard is provided with a plurality of connectors connected to the respective battery packs. In this case, if the connectors protrude from the backboard, the rack type power source device including an amount of protrusion of the connectors gets longer, resulting in an increase in installation space.

Meanwhile, if the backboard provided with connector terminals is disposed deep inside the rack, the connector terminals do not protrude outward from the rack. However, compartments for the battery packs inside the rack decrease in space.

It is an object of the present disclosure to provide a rack type power source device that ensures as spacious compartments as possible for battery packs in a rack while providing a space to dispose connector terminals connected to the battery packs and a cable connected to connectors in the rack.

A rack type power source device according to the present disclosure includes a plurality of battery packs, a rack to house the plurality of battery packs being arranged, and a connector plate fixed to the rack at a far side in a direction in which the battery packs are inserted into the rack. The connector plate is provided with a plurality of connectors designed to be electrically connected to terminals of the plurality of battery packs. The connector plate includes a side wall that constitutes a part of a first-side wall of the rack, and a connector mount wall disposed at an inner position in the rack so as to form a depth difference from the side wall. The connector mount wall is provided with the plurality of connectors arranged corresponding to the battery packs housed in the rack.

The rack type power source device according to the present disclosure ensures as spacious compartments as possible for the battery packs in the rack while providing a space to dispose the connectors connected to the battery packs and a cable connected between the battery packs in the rack.

DESCRIPTION OF EMBODIMENT

An exemplary embodiment of the present disclosure will now be described in detail with reference to the attached drawings. In the following description, specific shapes, materials, numerical values, directions, and other elements are examples shown to facilitate understanding of the present disclosure and may be changed as appropriate to suit uses, purposes, specifications, or other requirements. It is initially envisaged that when exemplary embodiments and modifications are included in the following description, some distinctive elements in the exemplary embodiments and the modifications are suitably combined and used.

In the following description, a direction of arrow X indicating a direction on a horizontal plane in FIG. 1 and other figures is referred to as a "width direction", a direction of arrow Y orthogonal to the direction of arrow X on the horizontal plane is referred to as a "length direction", and a direction of arrow Z orthogonal to arrows X and Y is referred to as a "vertical direction". In length direction Y, one side is referred to as a "front", and the other side is referred to as a "rear".

Figure 1:
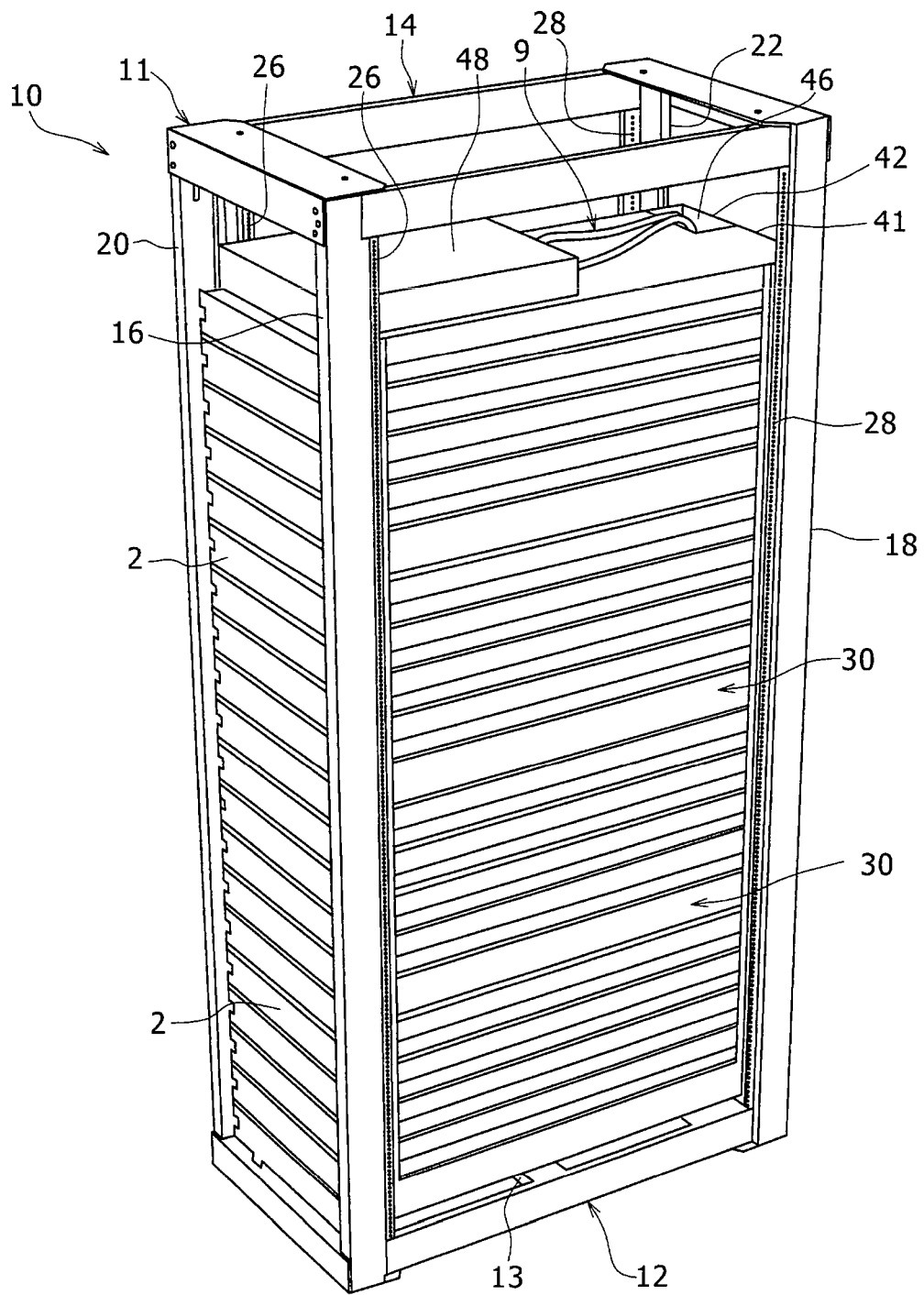
FIG. 1 is a front perspective view of a rack type power source device according to an exemplary embodiment of the present disclosure.
Figure 2:
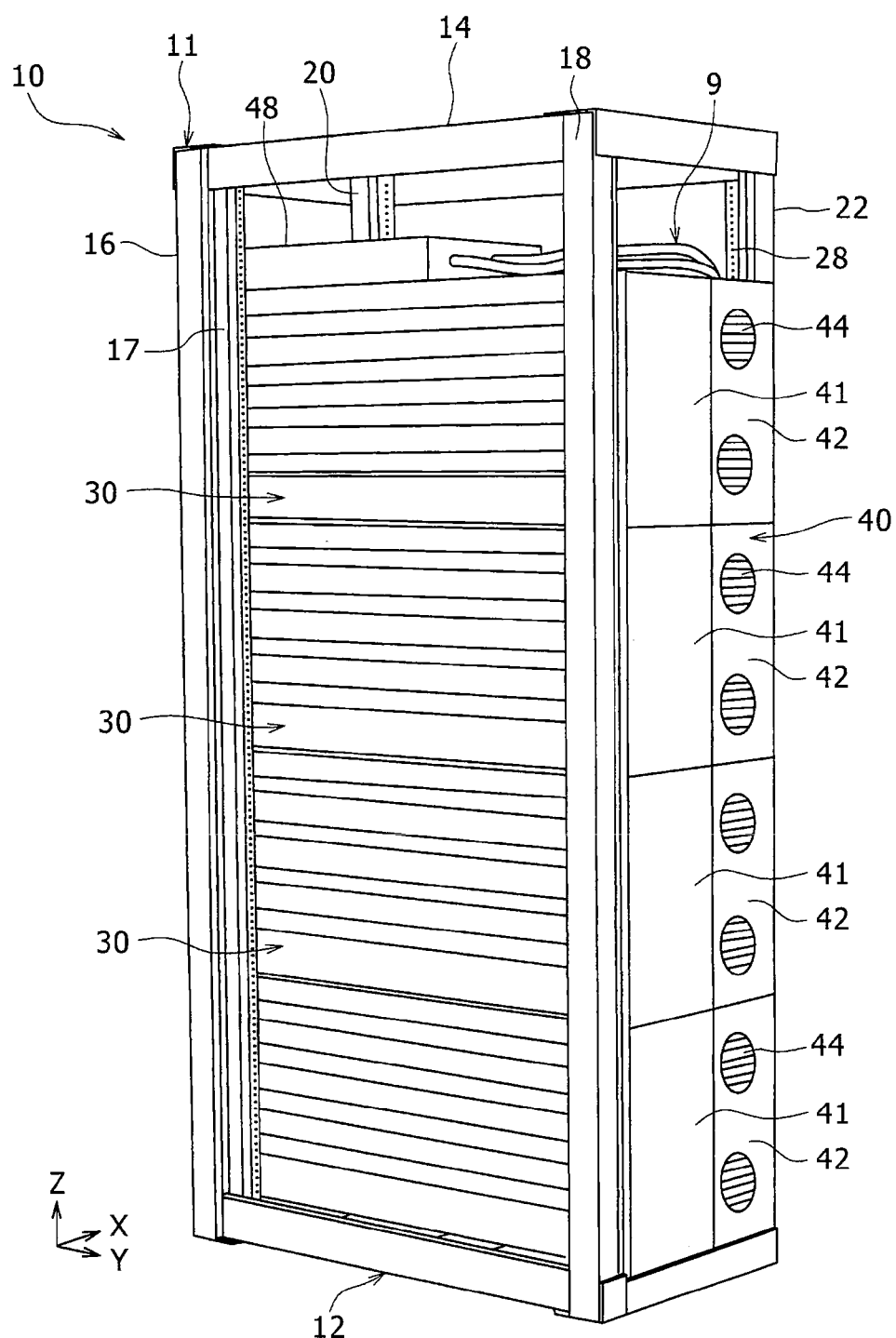
FIG. 2 is a rear perspective view of the rack type power source device.
Figure 3:
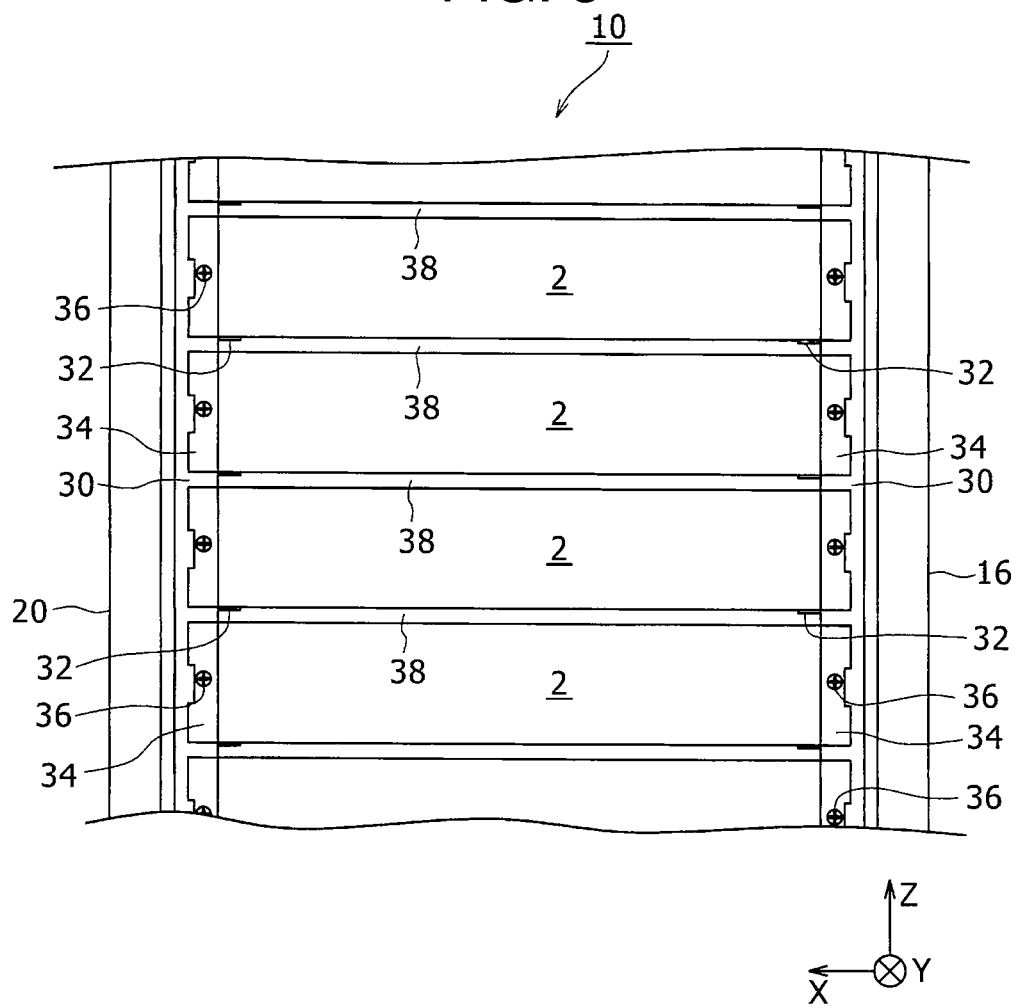
FIG. 3 is an elevation view of a part of the rack type power source device.

FIG. 1 is a front perspective view of rack type power source device 10 (hereinafter referred to as a "power source device" as appropriate) according to the exemplary embodiment of the present disclosure. FIG. 2 is a rear perspective view of power source device 10. FIG. 3 is an elevation view of a part of power source device 10.

As shown in FIG. 1, power source device 10 has rack 11 in which a plurality of battery packs 2 is housed. In this exemplary embodiment, rack 11 houses 20 battery packs 2 arranged at predetermined intervals in the vertical direction, for example. However, a number of battery packs 2 housed in one rack 11 is not limited to this example and may be changed as appropriate in accordance with external dimensions of each battery pack 2, a rated capacity of power source device 10, and other specifications.

As shown in FIGS. 1 and 2, rack 11 includes bottom frame 12, ceiling frame 14, and four props 16, 18, 20, 22. Rack 11 may be, for example, a standard rack such as a 19-inch rack. Preferably, rack 11 has enough strength to withstand even many heavy battery packs 2 housed, and is ideally made of steel, for example.

Bottom frame 12 and ceiling frame 14 are rectangular frames. Bottom frame 12 may be made up of four bottom frame parts that are joined together with fasteners such as bolts to form a rectangular shape, or may be integrated in advance. Reinforcing frame part 13 is disposed across a middle of bottom frame 12 along the width direction. Both ends of reinforcing frame part 13 are joined to bottom frame 12 with fasteners such as bolts.

In this exemplary embodiment, similarly to bottom frame 12, ceiling frame 14 may be made up of four bottom frame parts that are joined together with fasteners such as screws or bolts to form a rectangular shape, or may be integrated in advance. The present exemplary embodiment shows ceiling frame 14 that includes no ceiling plate. However, a configuration of the ceiling frame is not limited to this example. A ceiling plate may be disposed as a separate component or may be integrated with ceiling frame 14 to close a top face of ceiling frame 14 and reduce deposition of dust and the like. Similarly to bottom frame 12, ceiling frame 14 may have a reinforcing frame part across its middle to enhance frame structure strength.

Four props 16, 18, 20, 22 stand at four corners of bottom frame 12 and ceiling frame 14. Props 16, 18, 20, 22 are long components extending along the vertical direction and are angle bars having an L- or U-shaped cross section, for example. Bottom ends and top ends of props 16, 18, 20, 22 are fastened to bottom frame 12 and ceiling frame 14 respectively with fasteners such as screws or bolts, for example. As a result, bottom frame 12, ceiling frame 14, and four props 16, 18, 20, 22 constitute a frame structure including frame parts corresponding to 12 sides of a vertically long rectangular parallelepiped.

Out of the four props, two props 16, 20 located frontward have many attachment holes 26 formed at predetermined intervals along the vertical direction. Similarly, two props 18, 22 located at the rear of rack 11 have many attachment holes 28 formed at predetermined intervals along the vertical direction. Hereafter, two props 16, 20 of rack 11 may be referred to as front props, and two other props 18, 22 may be referred to as rear props.

Side panels 30 are attached to rack 11. Side panel 30 is attached to one side face of rack 11 in width direction X such that a front end of the side panel is fixed to attachment holes 26 of front prop 16 with screws or other fasteners (not shown) and a rear end of the side panel is fixed to attachment holes 28 of rear prop 18 with screws or other fasteners (not shown). Similarly, other side panel 30 is fixed to the other side face of rack 11 in width direction X (see FIG. 4).

In this exemplary embodiment, four side panels 30 are attached to each of the side faces of rack 11 in the width direction, for example. Each side panel 30 is formed of a metallic plate, for example, and has supports 32 that are each bent horizontally so as to project toward an inside of rack 11 in the width direction. Each side panel 30 has five supports 32, for example.

Supports 32 of side panels 30 attached to both sides of rack 11 in the width direction are disposed such that supports 32 on opposed sides project at identical levels. This configuration allows battery pack 2 of a flat rectangular parallelepiped shape to be housed in rack 11 when battery pack 2 is placed on two supports 32 on both sides in the width direction and is pressed inside from a front of rack 11. Accordingly, rack 11 is able to house 20 battery packs 2 corresponding to a number of supports 32 of side panels 30, with the battery packs arranged in the vertical direction.

In this exemplary embodiment as described above, rack 11 is provided with side panels 30 that are formed of metallic plates and are installed between front props 16, 20 and rear props 18, 22. Consequently, rack 11 provides improved structural strength and thus can house many heavy battery packs 2 in the vertical direction.

As shown in FIG. 3, battery pack 2 has fixing portions 34 that are attached to both sides of its front surface in the width direction by welding or other technique. Each battery pack 2 housed in rack 11 is fixed to rack 11 with screws 36 that are inserted through through holes in fixing portions 34 and tightened into female threads formed in side panels 30.

Gap 38 having an opening at the front of rack 11 is formed between battery packs 2 that are housed in and fixed to rack 11. Preferably, both sides of gap 38 in the width direction are closed with metallic plates forming side panels 30. Gaps 38 function as a cooling medium channel through which air flows from the front of rack 11 after being drawn in by action of a fan described later.

With reference again to FIGS. 1 and 2, connector plate 41 and fan plate 42 are attached to a rear surface of rack 11. Connector plate 41 is fixed to rack 11 at a far side in a direction in which battery packs 2 are inserted into rack 11, and is fixed to fan plate 42 connector plate 41. A part of connector plate 41 and fan plate 42 constitute backboard 40 that forms a rear wall surface (a first-side wall) of power source device 10 including rack 11. In this exemplary embodiment, the part of connector plate 41 is wider than fan plate 42 and occupies a larger area in backboard 40.

Preferably, connector plate 41 and fan plate 42 are each divided into a plurality of portions in the vertical direction. In this exemplary embodiment, connector plate 41 and fan plate 42 are each divided into four portions corresponding to a number of side panels 30, for example. The plates divided in this way advantageously facilitate the work of attaching connector plate 41 and fan plate 42 to rack 11. However, a configuration of the plates is not limited to this example, and connector plate 41 and fan plate 42 may be each a single piece extending long and thin along the vertical direction.

The four divided portions of fan plate 42 are each provided with two fans 44 that are disposed at an interval in the vertical direction. Fan plate 42 is disposed so as to face duct space 46 formed by connector plate 41 as described later. Air passes through each gap 38 between battery packs 2 to flow in power source device 10. Duct space 46 functions as a passage through which such air passes. A cooling operation performed by power source device 10 will be described later with reference to FIG. 8.

Figure 4:
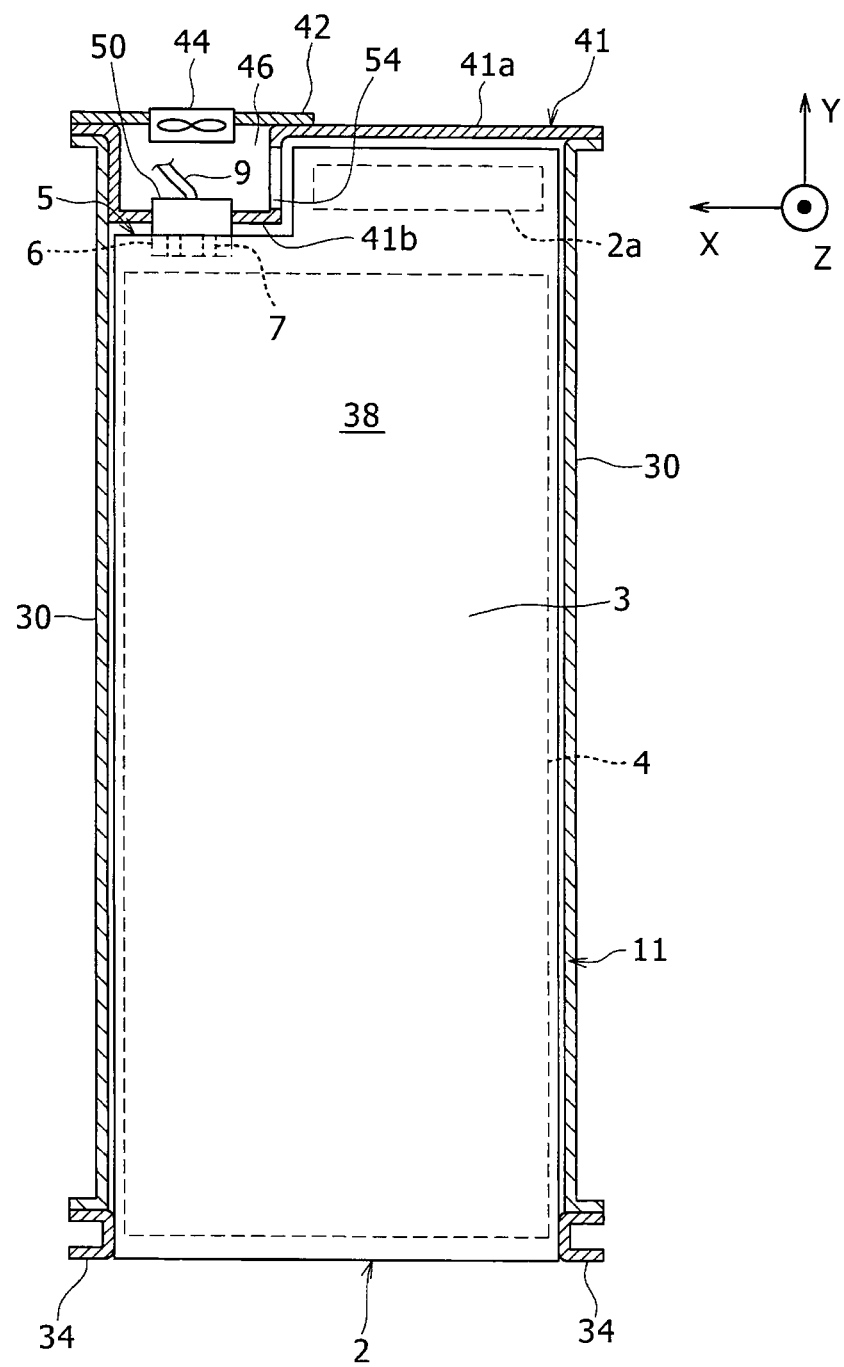
FIG. 4 is a top view illustrating a battery pack housed in a rack.

FIG. 4 is a top view illustrating one battery pack 2 housed in rack 11. As shown in FIG. 4, battery pack 2 includes case 3 with a substantially rectangular top surface that is long in a front-rear direction. With reference to FIGS. 1 to 3, case 3 is flat in shape. Case 3 is formed of a metal- or resin-made housing, for example.

Case 3 houses battery block 4. In this exemplary embodiment, battery block 4 may be made up of a plurality of battery blocks. In battery block 4, a plurality of single batteries is arranged and held in a metal- or resin-made holder (not shown in figures), for example. In this exemplary embodiment, single batteries housed in battery block 4 are connected in parallel. Preferably, the single batteries are secondary batteries such as cylindrical lithium ion batteries. However, the single batteries may be rectangular parallelepiped secondary batteries other than cylindrical secondary batteries.

Case 3 has cutout 5. Cutout 5 is a substantially flat rectangular parallelepiped in shape and is formed in one corner of a rear side of case 3 in length direction Y. Cutout 5 is a substantially rectangular cutout in a plan view. Cutout 5 may have the shape of a trapezoid, for example, other than the rectangular shape. The case has cutout 5 to avoid interference with connector mount wall 41b and intermediate wall 41c of connector plate 41 described later.

A side wall surface of cutout 5 facing a rear of power source device 10 has recess 6 with an opening. Recess 6 is provided with terminal 7 used to electrically connect a connector with each of the single batteries included in battery block 4 in battery pack 2. In this exemplary embodiment, terminal 7 is formed of a male connector projecting from an inner wall surface of recess 6 (see FIGS. 7A and 7B).

Female connector 50 is connected to terminal 7 in battery pack 2. As described in detail later, connector 50 is attached to connector mount wall 41b of connector plate 41, a component of backboard 40 in rack 11.

Cable 9 extends from connector 50. Cable 9 includes a power cable for electric power input and output, and a signal cable for outputting detection signals from a voltage sensor, a current sensor, and a temperature sensor (all not shown) installed in case 3 of battery pack 2. Cables 9 are each used to electrically connect adjacent battery packs 2 in series, for example. Cables 9 run upward inside duct space 46 and are connected to a controller described later. Ends of cables 9 are connected to connectors 50 corresponding to battery packs 2 such that cables 9 are each connected between battery packs 2.

In battery pack 2, case 3 houses control circuit 2a. Control circuit 2a has functions such as controlling electric power input into or output from battery pack 2 and monitoring the condition of the batteries. Control circuit 2a is disposed at a place where no cutout 5 exists in case 3 near the other corner of the rear side in length direction Y. Battery pack 2 includes control circuit 2a thus disposed at the place away from cutout 5 to effectively use space inside case 3. This configuration allows battery pack 2 to come down in size without a decrease in power density.

With reference again to FIGS. 1 and 2, controller 48 is disposed in an upper part of power source device 10. Controller 48 can be disposed on a top surface of uppermost battery pack 2 housed in rack 11. Alternatively, controller 48 may be disposed on a mount board that is installed above uppermost battery pack 2.

Cable 9 extending from an upper opening of duct space 46 is connected to controller 48. This configuration enables controller 48 to control electric power input into or output from each battery pack 2 housed in power source device 10. This configuration also enables controller 48 to monitor the condition of battery packs 2 based on signals of detected measurements such as voltages, currents, and temperatures sent from battery packs 2 via cables 9.

Figure 5:
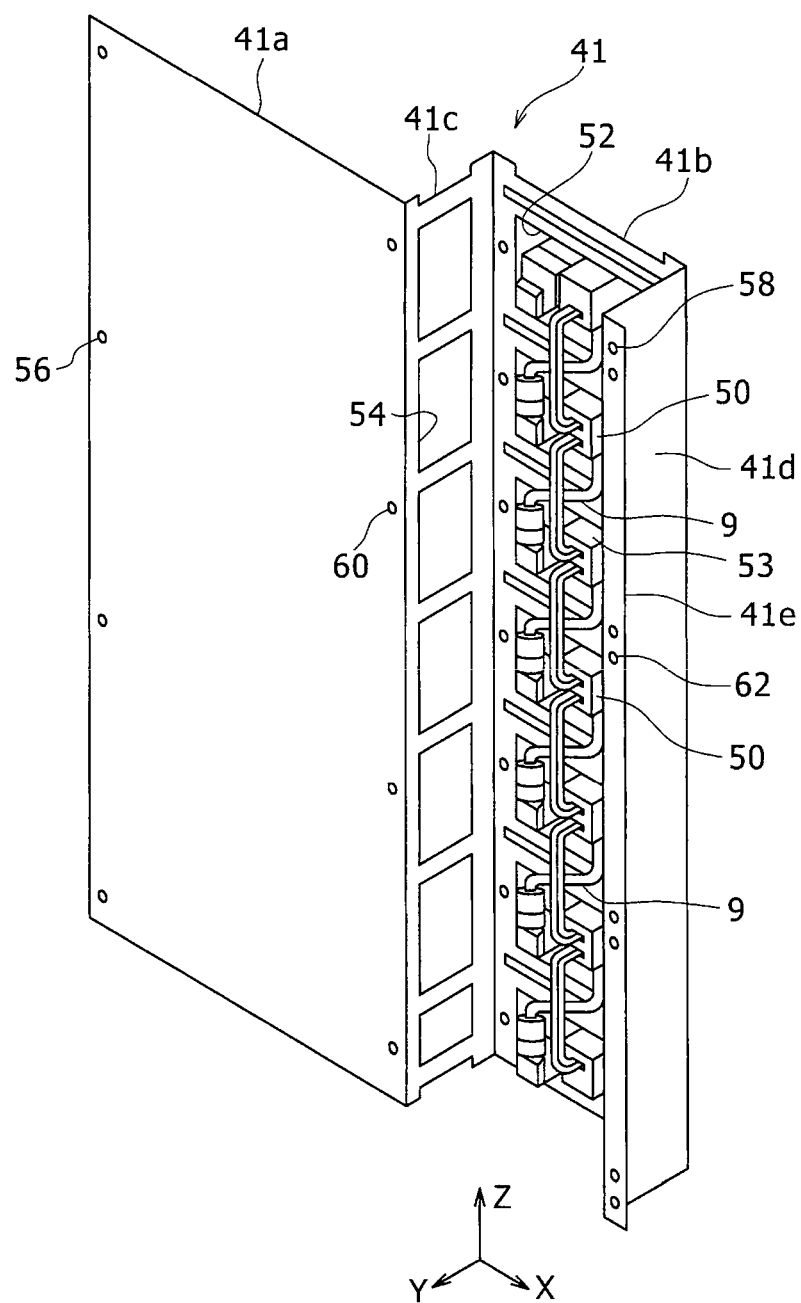
FIG. 5 is a perspective view of a connector plate fixed to the rack.

With reference to FIGS. 4 and 5, connector plate 41 in this exemplary embodiment will now be described in detail. FIG. 5 is a perspective view of connector plate 41 fixed to rack 11. In FIG. 5, connector plate 41 is viewed from the rear of power source device 10.

As shown in FIGS. 4 and 5, connector plate 41 includes side wall 41a that constitutes a part of backboard 40 (see FIG. 2) of rack 11 and connector mount wall 41b that is disposed at an inner position in rack 11 so as to form a depth difference from side wall 41a. Connector mount wall 41b is provided with a plurality of connectors 50 that is arranged corresponding to battery packs 2 housed in rack 11.

In this exemplary embodiment, connector plate 41 is formed by bending one piece of a metallic plate and die-cutting the metallic plate. Specifically, intermediate wall 41c included in connector plate 41 is bent in a direction substantially orthogonal to side wall 41a so as to have a wall surface along length direction Y. Connector mount wall 41b is bent in a direction substantially orthogonal to intermediate wall 41c so as to have a wall surface along width direction X. Thus, connector plate 41 represents the integration of these components, with a depth difference formed between side wall 41a and connector mount wall 41b by intermediate wall 41c.

Connector mount wall 41b of connector plate 41 has a plurality of laterally oblong rectangular openings 52 that is formed corresponding to battery packs 2 by die-cutting. Connectors 50 are disposed in respective openings 52. Opening 52 is made larger in vertical-direction dimension than connector 50. As a result, pieces of space 53 are formed between connector 50 and upper and lower edges of opening 52. In the rear of power source device 10, these pieces of space 53 communicate with each gap 38 between battery packs 2 housed in rack 11.

Intermediate wall 41c of connector plate 41 has a plurality of longitudinally oblong rectangular openings 54 that is arranged in the vertical direction. With reference to FIG. 4, in the rear of power source device 10, these openings 54 communicate with each gap 38 between battery packs 2 housed in rack 11.

As shown in FIG. 5, connector plate 41 further includes attachment wall 41d and attachment part 41e in an integral manner. The attachment wall is bent in a direction substantially orthogonal to connector mount wall 41b. The attachment part is formed by bending an end portion of attachment wall 41d. In this exemplary embodiment, attachment wall 41d is formed so as to be parallel with and opposed to intermediate wall 41c, whereas attachment part 41e is formed so as to be flush with side wall 41a.

Connector plate 41 has a plurality of through holes 56 formed in a first side of side wall 41a at intervals and a plurality of through holes 58 formed in attachment part 41e at intervals in the vertical direction. The connector plate is fixed to rack 11 by using screws or other fasteners through these through holes. As shown in FIG. 4, connector plate 41 may be fastened and fixed to ends of side panels 30 that are fixed to both sides of rack 11 in the width direction, or may be fastened and fixed to rear props 18, 22 of rack 11.

Fan plate 42 is attached to connector plate 41 by using screws or other fasteners through a plurality of through holes 60 formed in a second side of connector plate 41 at intervals and through holes 62 formed in attachment part 41e at intervals in the vertical direction.

Since fan plate 42 is attached to connector plate 41 in this way, duct space 46 is formed, as shown in FIG. 4, between both panels 41, 42, and fans 44 are disposed so as to face duct space 46. Both sides of duct space 46 in the width direction are defined by intermediate wall 41*c* and attachment wall 41*d* of connector plate 41. Duct space 46 is formed so as to extend in the vertical direction of power source device 10.

Connector mount wall 41*b* of connector plate 41 is located inward of side wall 41*a* in rack 11, and duct space 46 is formed between the connector mount wall and fan plate 42. Because of this configuration, even if connectors 50 housed in rack 11 project rearward from connector mount wall 41*b*, the connectors project only inside duct space 46 and never project rearward from the rear surface, i.e. backboard 40, of power source device 10. This configuration also allows cables 9 connected to connectors 50 to run inside duct space 46.

Thus, power source device 10 provides a space to dispose connectors 50 connected to battery packs 2 and each cable 9 connected between battery packs 2 in rack 11. As a result, the connectors and the cables are not exposed at and do not protrude from the rear surface of power source device 10. This configuration ensures that a dimension of power source device 10 is within a dimension of the rack in length direction Y and requires a smaller space for installation of power source device 10. Since connectors 50 and cables 9 are not exposed to an outside of power source device 10, the power source device provides improved safety and a neat external appearance.

If a backboard on which connectors 50 are mounted is entirely disposed deep inside rack 11, the connectors do not protrude outward from rack 11. However, a compartment for battery packs 2 inside rack 11 decreases in space. In contrast, power source device 10 according to this exemplary embodiment has connector mount wall 41*b* that is only a part of connector plate 41, a component of backboard 40, and that is disposed with a depth difference from side wall 41*a*. This configuration provides as spacious a compartment as possible for the battery packs inside rack 11.

Figure 6A:
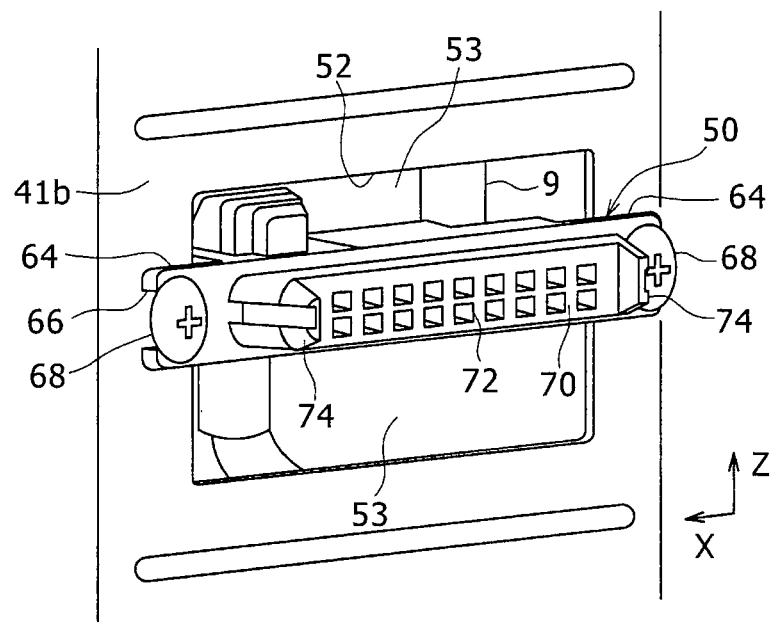
FIG. 6A is an enlarged front perspective view of a connector attached to the connector plate.
Figure 6B:
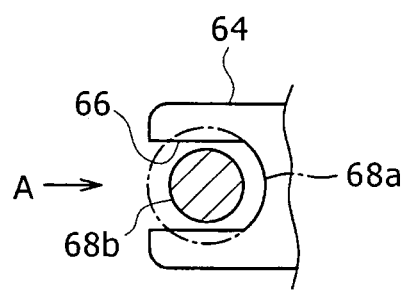
FIG. 6B is an enlarged elevation view of an attachment part of the connector.
Figure 6C:
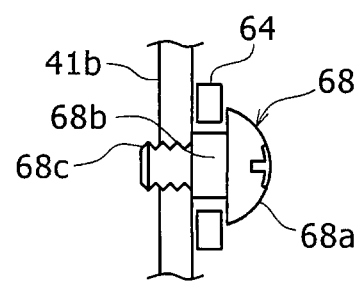
FIG. 6C is a side view, viewed along arrow A in FIG. 6B.

Next, with reference to FIGS. 6 and 7, a structure in which connector 50 is attached to connector plate 41 and connection between terminal 7 of battery pack 2 and connector 50 will be described. FIG. 6A is an enlarged front perspective view of connector 50 attached to connector plate 41. FIG. 6B is an enlarged elevation view of an attachment part of the connector. FIG. 6C is a side view, viewed along arrow A in FIG. 6B.

As described above, connectors 50 are disposed in respective openings 52 formed in connector mount wall 41*b* of connector plate 41. As shown in FIG. 6A, both ends of connector 50 in width direction X form attachment parts 64. As shown in FIG. 6B, attachment part 64 has U-shaped cutout 66. Connectors 50 are attached to connector mount wall 41*b* with bolts 68 inserted through cutouts 66.

As shown in FIGS. 6B and 6C, bolt 68 includes head 68*a*, cylindrical part 68*b* that is smaller in diameter than head 68*a*, and thread 68*c* that is smaller in diameter than cylindrical part 68*b*. Attachment parts 64 of connector 50 are made thinner than a length of cylindrical part 68*b* of bolt 68 in an axial direction. Hence, as shown in FIG. 6C, when thread 68*c* is fastened into a female thread hole in connector mount wall 41*b*, attachment part 64 is not clamped between head 68*a* of bolt 68 and connector mount wall 41*b* and thus is movable. As shown in FIG. 6B, a diameter of cylindrical part 68*b* of bolt 68 is set smaller than a width of cutout 66 of attachment part 64 in vertical direction Z, and the cylindrical part is located apart from a bottom of cutout 66. Consequently, connector 50 is mounted such that a position of the attached connector is adjustable in vertical direction Z and width direction X along a surface of connector mount wall 41*b*. In this exemplary embodiment, connector 50 is positionally adjustable from around 2 mm to several millimeters, for example, in both vertical direction Z and width direction X. Meanwhile, the position of connector 50 in the front-rear direction is almost regulated by connector mount wall 41*b* and head 68*a* of bolt 68.

As shown in FIG. 6A, connector 50 includes connector body 70 being disposed in a middle in the width direction and projecting forward. Connector body 70 is a part of the connector that is inserted into recess 6 formed in cutout 5 of battery pack 2. An end face of connector body 70 has a plurality of female terminal holes 72 that is arranged and that pins of terminal 7 are inserted into. Both ends of connector body 70 in the width direction form guide parts 74 that project from the end faces of connector body 70. Guide part 74 tapers to a substantially truncated semiconical tip.

When battery pack 2 is inserted from the front of the rack to insert connector body 70 into recess 6 of battery pack 2, a positional discrepancy may occur between connector body 70 and recess 6 of battery pack 2 due to an error in manufacturing of rack 11 or other cause, for example. In this case, power source device 10 of this exemplary embodiment adjusts the position by putting tapered tip faces of guide parts 74 into contact with an opening edge of recess 6 and thereby moving connector 50 so as to resolve the positional discrepancy.

Figure 7A:
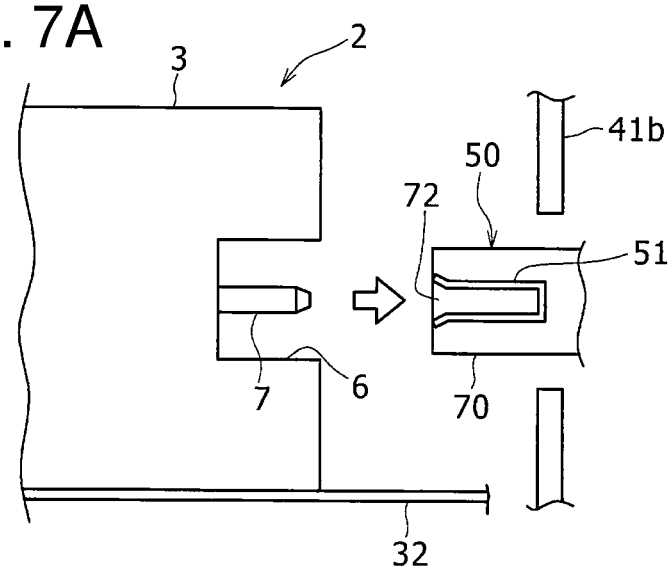
FIGS. 7A and 7B are drawings illustrating how the battery pack is inserted in the rack and a terminal of the battery pack is connected to the connector.
Figure 7B:
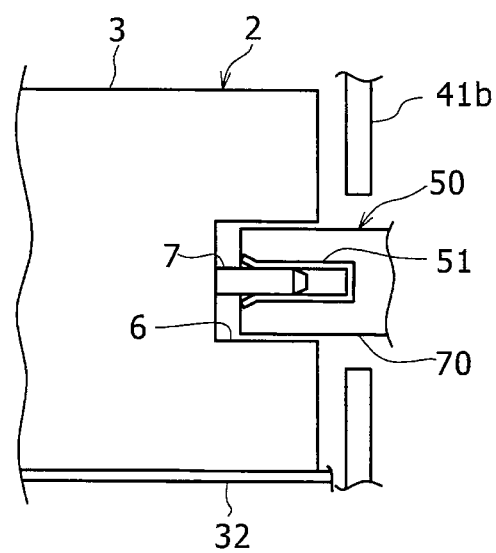

FIGS. 7A and 7B are drawings illustrating how battery pack 2 is inserted in rack 11 and terminal 7 of battery pack 2 is connected to connector 50. As shown in FIG. 7A, battery pack 2 is inserted into rack 11 from the front of rack 11. Then, battery pack 2 is pushed rearward while being supported on supports 32 (see FIG. 3) of side panels 30. A position of battery pack 2 in the width direction at this time is almost regulated such that a gap of around 1 mm to 2 mm is left between the battery pack and each of side plates 30.

In response to an approach of battery pack 2 to a predetermined storage location, guide parts 74 of connector 50, as described above, come into contact with the opening edge of recess 6 in battery pack 2 and the position of connector 50 is thereby adjusted. This makes connector body 70 of connector 50 insertable into recess 6 in battery pack 2. As shown in FIG. 7B, when battery pack 2 is fully pushed inside, pin-shaped terminal 7 of battery pack 2 is inserted into female terminal hole 72 of connector body 70 and is electrically connected to female terminal 51 that is embedded in the connector. The power source device determines a position of connector body 70 fully inserted into recess 6 in battery pack 2 by putting the tips of guide parts 74 of connector body 70 into contact with an internal wall surface of recess 6.

According to power source device 10 of this exemplary embodiment, terminal 7 of battery pack 2 can be readily and reliably connected to connector 50 if battery pack 2 is inserted from the front of rack 11 and pushed inside. This is effective especially when terminal 7 of battery pack 2 needs to be connected to connector 50 without a visual check.

In the exemplary embodiment described above, terminal 7 of battery pack 2 is a male terminal with pins, and connector 50 is a female terminal. This example, however, should not be construed to limit the scope of the present disclosure. Terminal 7 of battery pack 2 may be a female terminal and connector 50 may be a male terminal with pins.

Figure 8:
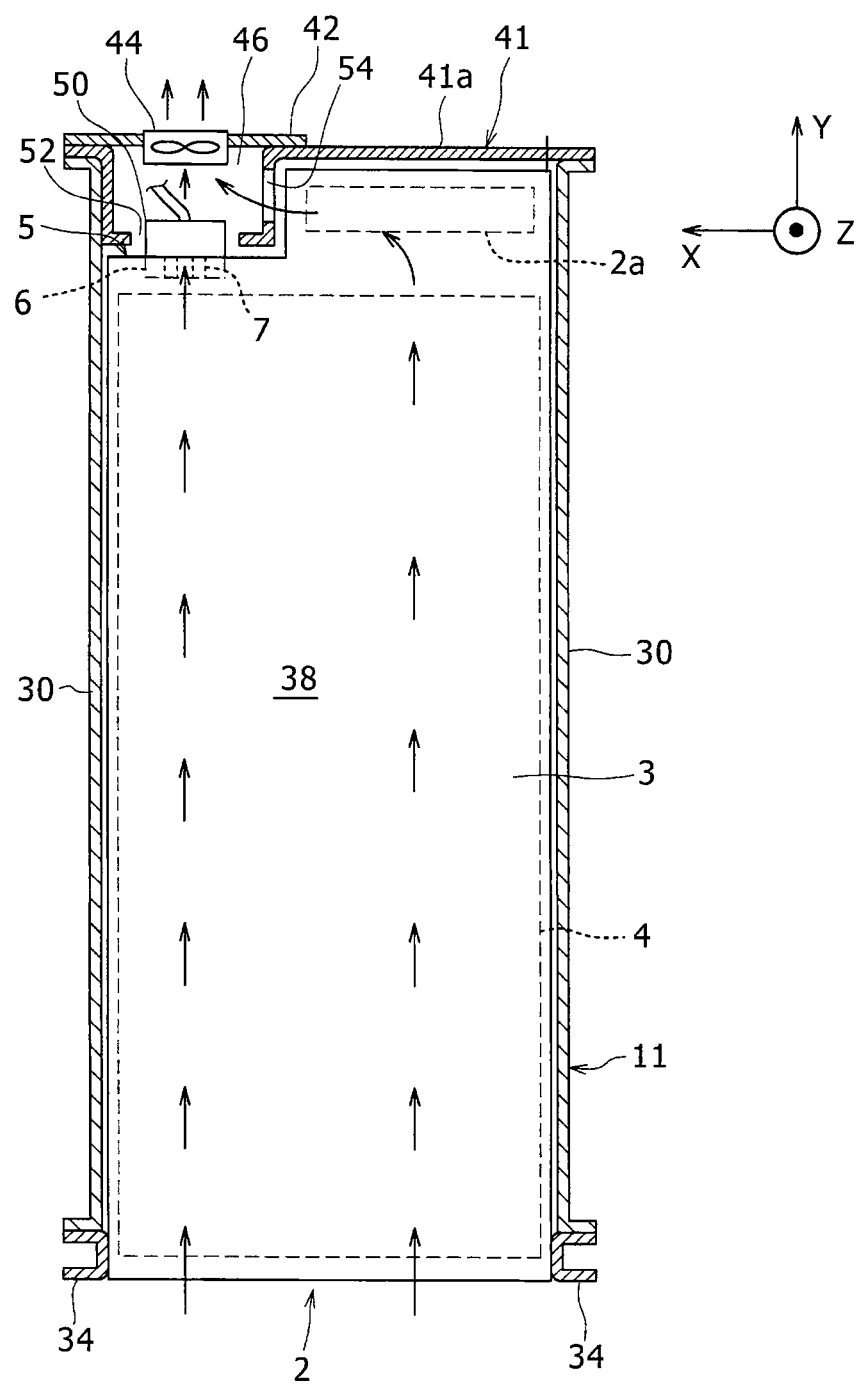
FIG. 8 is a plan view of a configuration corresponding to the configuration of FIG. 4, illustrating how cooling air flows in the rack type power source device by action of a fan.

FIG. 8 is a plan view of a configuration corresponding to the configuration of FIG. 4, illustrating how cooling air flows in power source device 10 by action of fan 44.

In power source device 10 of this exemplary embodiment, duct space 46 also serves as a cooling medium channel that air for cooling battery pack 2 flows through. Specifically, as indicated by arrows in FIG. 8, when fans 44 installed on the rear surface of rack 11 are driven, air is drawn in through the opening of each gap 38 between battery packs 2 at the front of rack 11. Since both sides of gaps 38 in the width direction are closed by side panels 30, air flows rearward to cool battery packs 2 by passing through gaps 38 while being in contact with surfaces of cases 3 of battery packs 2. Then, air coming from gaps 38 flows into duct space 46 through pieces of space 53 (see FIG. 6) between openings 52 of connector mount wall 41b and connectors 50, as well as openings 54 of intermediate wall 41c, and is discharged from the duct space to the outside of power source device 10 by fans 44.

In power source device 10 according to this exemplary embodiment, duct space 46 where connectors 50 and cables 9 are disposed serves as a cooling medium channel. Thus, rack type power source device 10 can have a structure for cooling battery packs without being equipped with an additional component such as a duct part.

The scope of the present disclosure should not be limited to the exemplary embodiment and modifications described above. Further, various modifications or alterations may be made to the exemplary embodiment within the scope of the present disclosure as defined by the appended claims or their equivalents.

The invention claimed is:

1. A rack type power source device comprising:
   a plurality of battery packs;
   a rack to house the plurality of battery packs being arranged; and
   a connector plate separately provided from the rack and fixed to the rack, the connector plate being provided with a plurality of connectors designed to be electrically connected to terminals of the plurality of battery packs,
   wherein the connector plate comprises:
      a side wall that constitutes a part of a first-side wall of the rack; and
      a connector mount wall disposed at an inner position in the rack so as to form a depth difference from the side wall, the connector mount wall being provided with the plurality of connectors arranged corresponding to one of the plurality of battery packs housed in the rack,
   wherein each of the plurality of battery packs has a cutout which is formed in a surface of each of the plurality of battery packs facing the connector plate, and
   wherein the connector mount wall is accommodated in the cutout.

2. A rack type power source device comprising:
   a plurality of battery packs;
   a rack to house the plurality of battery packs being arranged; and
   a connector plate separately provided from the rack and fixed to the rack, the connector plate being provided with a plurality of connectors designed to be electrically connected to terminals of the plurality of battery packs,
   wherein the connector plate comprises:
      a side wall that constitutes a part of a first-side wall of the rack; and
      a connector mount wall disposed at an inner position in the rack so as to form a depth difference from the side wall, the connector mount wall being provided with the plurality of connectors arranged corresponding to one of the plurality of battery packs housed in the rack, and
   wherein the connectors are mounted in such a way that a position of each of the plurality of connectors is adjustable along a surface of the connector mount wall.

3. The rack type power source device according to claim 2,
   wherein each of the plurality of connectors has a guide part to align each of the plurality of connectors with each of the terminals of the plurality of battery packs.

4. A rack type power source device comprising:
   a plurality of battery packs;
   a rack to house the plurality of battery packs being arranged; and
   a connector plate separately provided from the rack and fixed to the rack, the connector plate being provided with a plurality of connectors designed to be electrically connected to terminals of the plurality of battery packs,
   wherein the connector plate comprises:
      a side wall that constitutes a part of a first-side wall of the rack; and
      a connector mount wall disposed at an inner position in the rack so as to form a depth difference from the side wall, the connector mount wall being provided with the plurality of connectors arranged corresponding to one of the plurality of battery packs housed in the rack,
   wherein a fan is disposed so as to face a duct space formed due to the depth difference, and
   wherein the connector mount wall has an opening through which the duct space communicates with a cooling medium channel between the plurality of battery packs.

5. The rack type power source device according to claim 4,
   wherein the connector plate further comprises a joint wall to join the side wall to the connector mount wall so as to form a depth difference between the side wall and the connector mount wall, and
   wherein the joint wall has another opening through which the duct space communicates with the cooling medium channel.

6. The rack type power source device according to claim 1,
   wherein each of the plurality of battery packs is shaped into a rectangle in a plan view and has a cutout in one corner of the rectangle to avoid interference with the connector mount wall and an intermediate wall disposed so as to form the depth difference, and
   wherein each of the battery packs houses a control circuit near another corner of the rectangle without the cutout to control operation of each of the plurality of battery packs.

7. A rack type power source device comprising:
   a plurality of battery packs;
   a rack to house the plurality of battery packs being arranged; and
   a plurality of connector plates each provided to a corresponding one of the plurality of battery packs, wherein:
   each of the plurality of connector plates is provided with a plurality of connectors designed to be electrically connected to terminals of the corresponding one of the plurality of battery packs,
   each of the plurality of connector plates comprises:
      a side wall that constitutes a part of a first-side wall of the rack; and a connector mount wall disposed at an inner position in the rack so as to form a depth difference from the side wall, the connector mount wall being provided with the plurality of connectors, each of the plurality of battery packs has a cutout which is formed in a surface of each of the plurality of battery packs facing each of the plurality of connector plates, and the connector mount wall is accommodated in the cutout.

* * * * *